US011437898B2

(12) United States Patent
van Ginkel

(10) Patent No.: US 11,437,898 B2
(45) Date of Patent: Sep. 6, 2022

(54) BRUSHLESS DIRECT CURRENT MOTOR WITH DUAL STATORS

(71) Applicant: Dana Automotive Systems Group, LLC, Maumee, OH (US)

(72) Inventor: Johannes N. van Ginkel, Bruges (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 891 days.

(21) Appl. No.: 16/050,304

(22) Filed: Jul. 31, 2018

(65) Prior Publication Data

US 2020/0044524 A1 Feb. 6, 2020

(51) Int. Cl.
| | |
|---|---|
| *H02K 16/04* | (2006.01) |
| *H02K 1/12* | (2006.01) |
| *H02K 1/278* | (2022.01) |
| *H02K 3/28* | (2006.01) |
| *H02K 29/08* | (2006.01) |
| *H02K 29/12* | (2006.01) |
| *H02P 7/00* | (2016.01) |
| *H02P 7/06* | (2006.01) |

(52) U.S. Cl.
CPC ............... *H02K 16/04* (2013.01); *H02K 1/12* (2013.01); *H02K 1/278* (2013.01); *H02K 3/28* (2013.01); *H02K 29/08* (2013.01); *H02K 29/12* (2013.01); *H02P 7/00* (2013.01); *H02P 7/06* (2013.01)

(58) Field of Classification Search
CPC ............ H02K 1/12; H02K 1/278; H02K 3/28; H02K 16/04; H02K 29/08; H02K 29/12; H02P 7/00; H02P 7/06

USPC .............. 310/12.15, 49.29, 49.46, 49.51, 71, 310/156.35, 254.1; 318/245
See application file for complete search history.

(56) References Cited

U.S. PATENT DOCUMENTS

| | | | | |
|---|---|---|---|---|
| 5,691,583 | A * | 11/1997 | Suzuki | H02K 3/525 310/71 |
| 5,864,197 | A * | 1/1999 | Naito | H02K 19/103 310/216.109 |
| 8,040,085 | B2 | 10/2011 | Kawamura | |
| 9,847,693 | B2 | 12/2017 | Huang | |
| 9,912,280 | B2 | 3/2018 | Suzuki | |
| 9,914,362 | B2 | 3/2018 | Ngo | |
| 11,005,313 | B2 * | 5/2021 | Saban | H02K 1/148 |
| 2004/0183393 | A1 | 9/2004 | Suzuki | |
| 2009/0072645 | A1 * | 3/2009 | Quere | H02K 16/00 310/114 |
| 2010/0211241 | A1 * | 8/2010 | Goodwin | B60L 50/16 701/22 |

(Continued)

FOREIGN PATENT DOCUMENTS

| | | |
|---|---|---|
| DE | 10339621 | 4/2005 |
| JP | H0923686 | 1/1997 |

(Continued)

*Primary Examiner* — Rashad H Johnson
(74) *Attorney, Agent, or Firm* — McCoy Russell LLP

(57) ABSTRACT

A brushless direct current motor including a rotor, a first stator disposed adjacent the rotor, and a second stator disposed adjacent the rotor. The first stator is configured to selectively cause a rotational movement of the rotor during normal operation of the motor, and the second stator is configured to selectively maintain a stationary position of the rotor against a force exerted by an external source.

19 Claims, 5 Drawing Sheets

(56) References Cited

U.S. PATENT DOCUMENTS

| | | | |
|---|---|---|---|
| 2013/0099618 A1* | 4/2013 | Kusase | H02K 23/38 310/156.56 |
| 2014/0265694 A1* | 9/2014 | Matsuoka | H02K 16/00 310/112 |
| 2015/0037180 A1* | 2/2015 | Abbott | H02K 49/102 417/420 |
| 2015/0171672 A1* | 6/2015 | Pietromonaco | H02K 19/103 318/254.1 |
| 2018/0009426 A1 | 1/2018 | Masuda | |
| 2018/0013360 A1 | 1/2018 | Eshleman | |
| 2018/0019646 A1 | 1/2018 | Quick | |
| 2018/0034395 A1 | 2/2018 | Huang | |
| 2018/0062546 A1 | 3/2018 | Xiang | |
| 2018/0065221 A1 | 3/2018 | Cheng | |
| 2018/0067166 A1 | 3/2018 | Bock | |
| 2018/0069465 A1 | 3/2018 | Rezaee | |
| 2018/0069493 A1 | 3/2018 | Roberts | |
| 2018/0072308 A1 | 3/2018 | Miyaishi | |
| 2018/0073585 A1 | 3/2018 | Masuda | |
| 2018/0076701 A1 | 3/2018 | Hunter | |
| 2021/0210998 A1* | 7/2021 | Yabe | H02K 16/04 |

FOREIGN PATENT DOCUMENTS

| | | |
|---|---|---|
| JP | 2004304997 | 10/2004 |
| JP | 2010011637 | 1/2010 |
| WO | 2018032617 | 2/2018 |

* cited by examiner

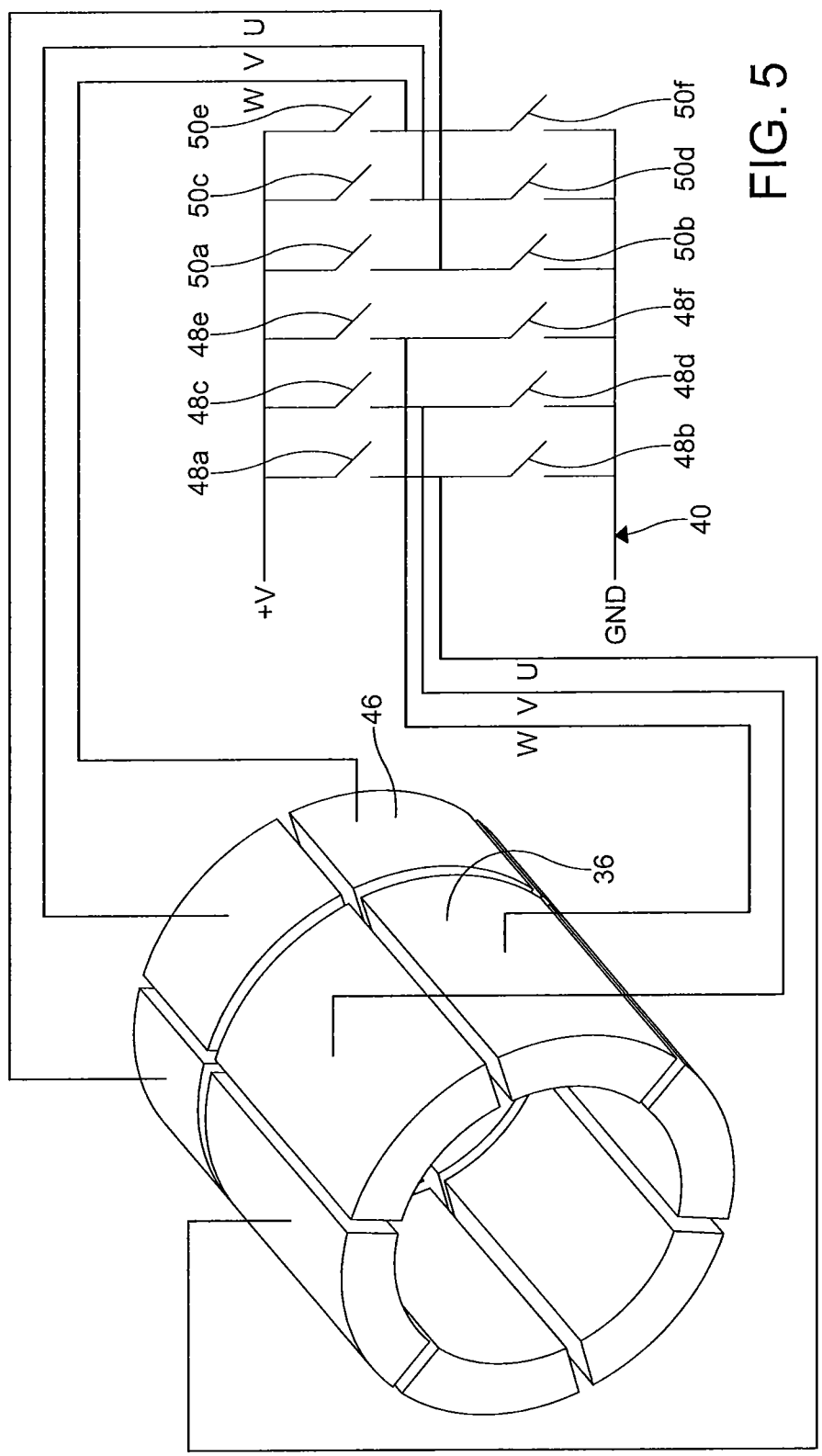

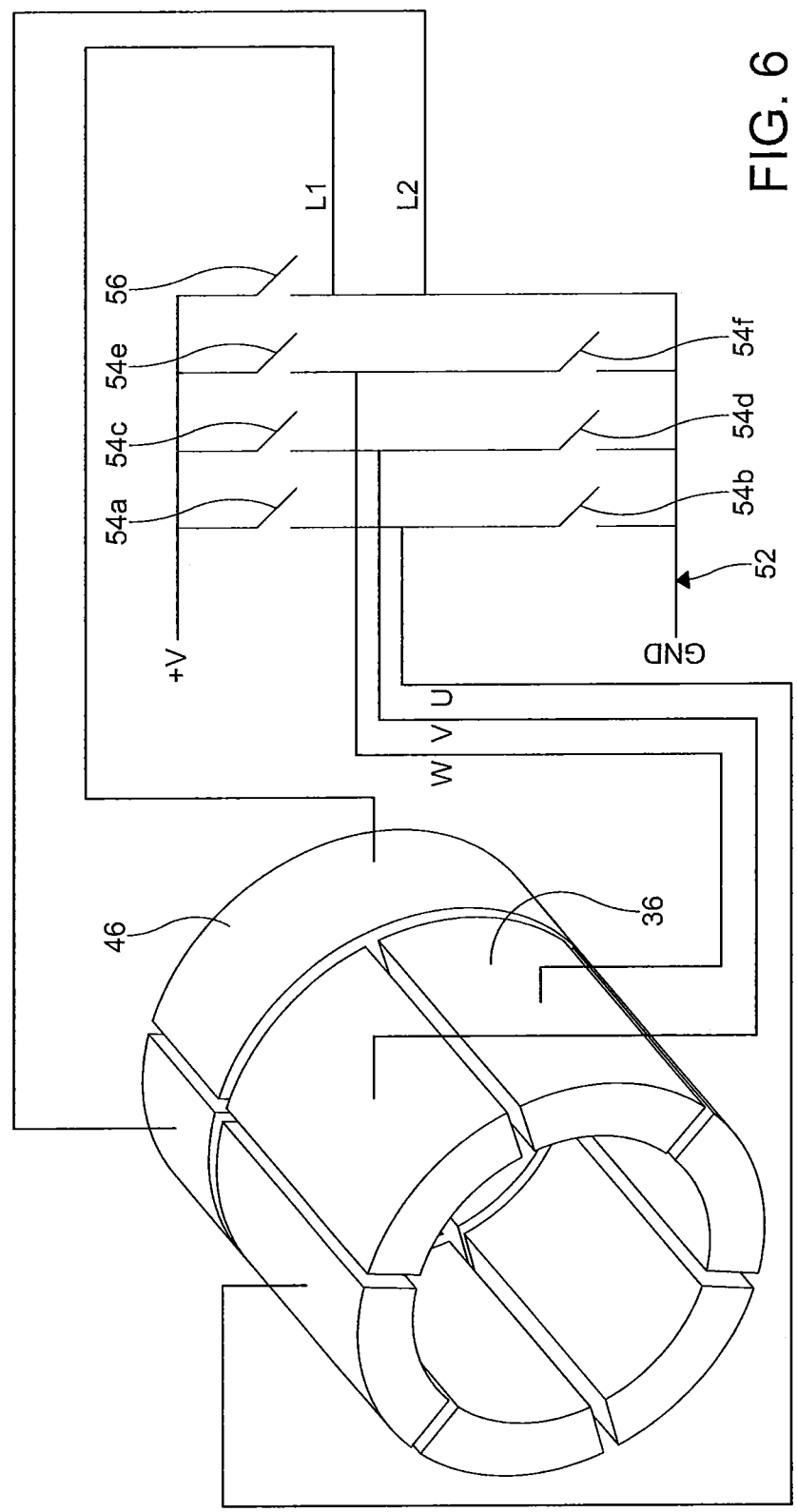

BRUSHLESS DIRECT CURRENT MOTOR WITH DUAL STATORS

FIELD

The subject matter of the embodiments described herein is directed toward a brushless direct current motor, and more particularly to a brushless direct current motor having a rotor, a first stator, and a second stator configured to maintain a stationary position of the rotor.

BACKGROUND

Brushless direct current (BLDC) motors are used in applications across many industries including automotive, aerospace, consumer, medical, industrial automation equipment and instrumentation applications. A BLDC motor includes a stator with electromagnetic poles with windings thereon and a rotor with magnets mounted on a surface thereof creating permanent magnetic poles. The stator and the rotor magnetically interact with each other when electric current flows in the windings. BLDC motors require a supply of electrical current to the windings that is synchronized to the rotor position. The flow of the electrical current through each of windings is performed at a synchronized time to form a continuous rotating magnetic field, which can be achieved as a rotor position is recognized.

BLDC motors most commonly use a three-phase configuration with positional sensors imbedded in the BLDC motor to define certain positions of the rotor for each phase (U, V, W). A conventional three-phase BLDC motor includes a rotor having a plurality of magnetic poles and a stator including U, V and W phase windings. In typical three-phase BLDC motor operations, two of the three phases of the BLDC motor conduct electrical current while the other phase has zero electrical current, i.e. a dead phase, in order for the rotation of the rotor to occur. Additionally, the three-phase BLDC motor has six states of magnetic flux within an operational sequence. Progression through all six states of magnetic flux within the operational sequence results in a 360° rotation of the rotor. As such, a continued rotation of the rotor is achieved by repeating the operational sequence many times over.

In certain applications, however, there is a need to cease the rotation of the rotor and maintain a stationary position thereof by producing a resisting force against a force exerted by an external source. The stator of the conventional BLDC motor, however, is configured to achieve certain performance requirements for normal operation. As such, a supply of relatively large and continuous electrical current through the U, V and W phase winding of the stator can lead to overheating and failure of the BLDC motor.

It would be desirable to produce a BLDC motor that is configured to maintain a stationary position of the rotor.

SUMMARY

In concordance and agreement with the present disclosure, a BLDC motor that is configured to maintain a stationary position of the rotor, has surprisingly been discovered.

In one embodiment, a brushless direct current motor, comprises: a rotor; a first stator disposed adjacent the rotor; and a second stator disposed adjacent the rotor, wherein the second stator is configured to selectively maintain a stationary position of the rotor against a force exerted by an external source.

As aspects of certain embodiments, at least one of the first stator and the second stator is disposed radially about the rotor.

As aspects of certain embodiments, the second stator is disposed axially adjacent the first stator.

As aspects of certain embodiments, the first stator is a three-phase stator.

As aspects of certain embodiments, the second stator is one of a three-phase stator and a single-phase stator.

As aspects of certain embodiments, a torque constant Kt of the second stator is greater than a torque constant Kt of the first stator.

As aspects of certain embodiments, the first stator includes a plurality of windings formed thereon.

As aspects of certain embodiments, the second stator includes a plurality of windings formed thereon.

As aspects of certain embodiments, a number of the windings of the second stator is greater than a number of the windings of the first stator.

As aspects of certain embodiments, an air gap between the windings of the first stator is greater than an air gap between the windings of the second stator.

As aspects of certain embodiments, a length of the second stator is greater than a length of the first stator.

As aspects of certain embodiments, the brushless direct current motor further includes a control system in electrical communication with the first stator and the second stator, wherein the control system includes at least one switch to selectively control a supply of electrical current to the first stator and at least one switch to selectively control a supply of electrical current to the second stator.

In another embodiment, a method for controlling a brushless direct current motor, comprises the steps of: providing a brushless direct current motor including a rotor, a first stator disposed adjacent the rotor, and a second stator disposed adjacent the rotor; selectively supplying an electrical current to the first stator to cause a rotational movement of the rotor; and selectively supplying an electrical current to the second stator to maintain a stationary position of the rotor by producing a resistive force against a force exerted by an external source.

As aspects of certain embodiments of the method for controlling the brushless direct current motor, a torque constant Kt of the second stator is greater than a torque constant Kt of the first stator.

As aspects of certain embodiments of the method for controlling the brushless direct current motor, further includes the step of providing a control system in electrical communication with the first stator and the second stator, wherein the control system includes at least one switch to selectively control a supply of electrical current to the first stator and at least one switch to selectively control a supply of electrical current to the second stator.

BRIEF DESCRIPTION OF THE DRAWINGS

The above, as well as other advantages of the present embodiments, will become readily apparent to those skilled in the art from the following detailed description when considered in the light of the accompanying drawings in which:

FIG. 5 is a schematic perspective view of the stators shown in FIG. 1 including a schematic depicting a control system of the stators according to an embodiment, wherein the second stator is a three-phase stator; and FIG. 6 is a schematic perspective view of the stators shown in FIG. 1 including a schematic depicting a control system of the stators according to an embodiment, wherein the second stator is a single-phase stator.

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting.

Figure 1:
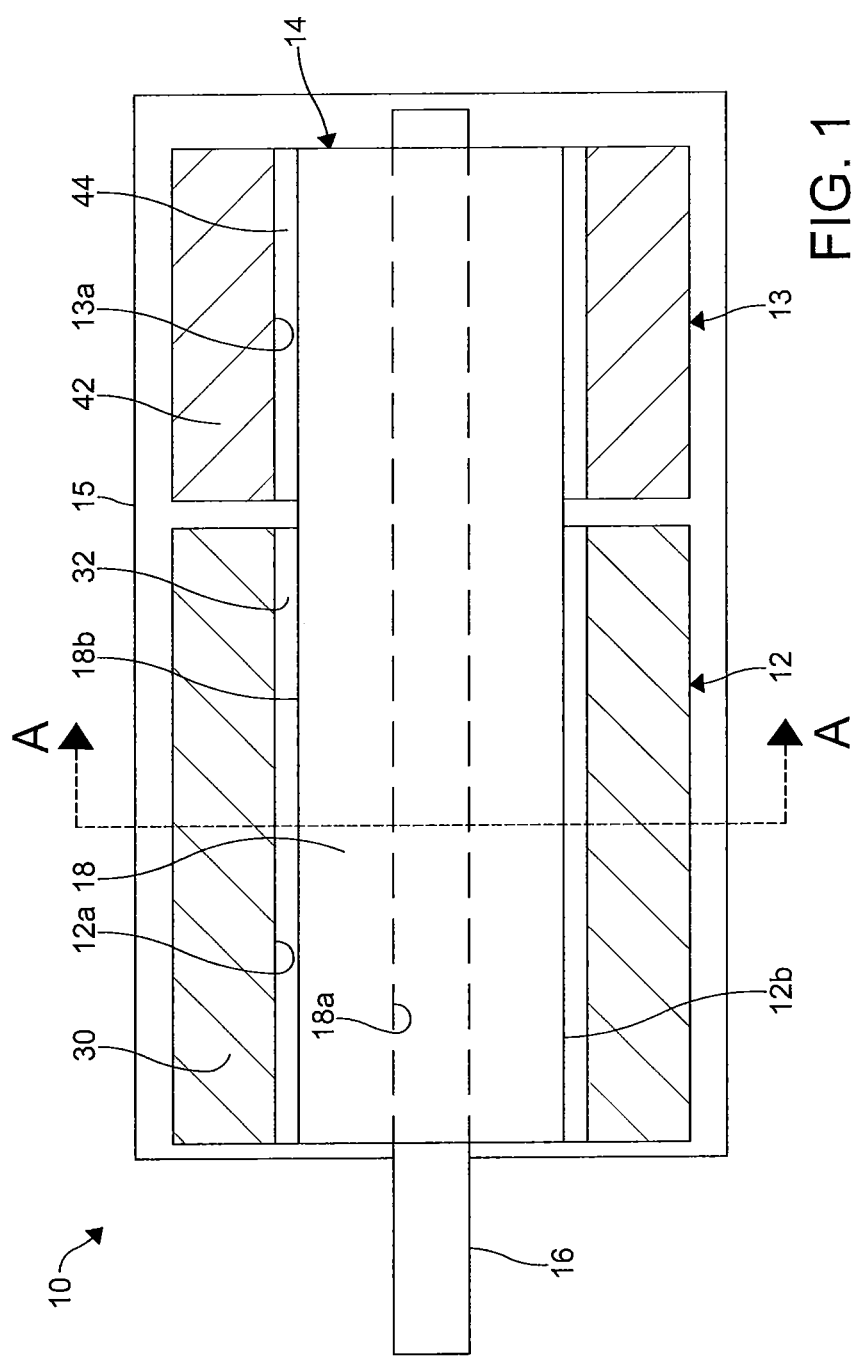
FIG. 1 is a schematic cross-sectional view taken along a longitudinal axis of a preferred embodiment of a BLDC motor including a casing having a first stator, a second stator, and a rotor disposed within the stators.

FIG. 1 depicts a brushless direct current (BLDC) motor 10 according one embodiment. The motor 10 includes a first stator 12, a second stator 13 disposed axially adjacent the first stator 12 relative to a longitudinal axis of the motor 10, and a rotor 14 which is rotatable relative to the stators 12, 13 to convert electrical power to mechanical power. The stators 12, 13 and the rotor 14 are disposed within a casing 15. It is understood that the casing 15 can be any size and shape as desired.

In the embodiment shown in FIG. 1, the motor 10 includes outer stators 12, 13 and an inner rotor 14. It is understood that the motor 10 may include inner stators and an outer rotor if desired. The rotor 14 includes a shaft 16 and a cylindrical rotor core 18. The rotor core 18 may be made from any material as desired such as a ferromagnetic material, for example. The rotor core 18 has a peripheral inner surface 18a and a peripheral outer surface 18b. The rotor core 18 is connected to the shaft 16 on the inner surface 18a thereof. The shaft 16 shown is a rotary shaft. In certain embodiments, the shaft 16 is coupled to a driving shaft (not illustrated) of the motor 10.

Figure 2:
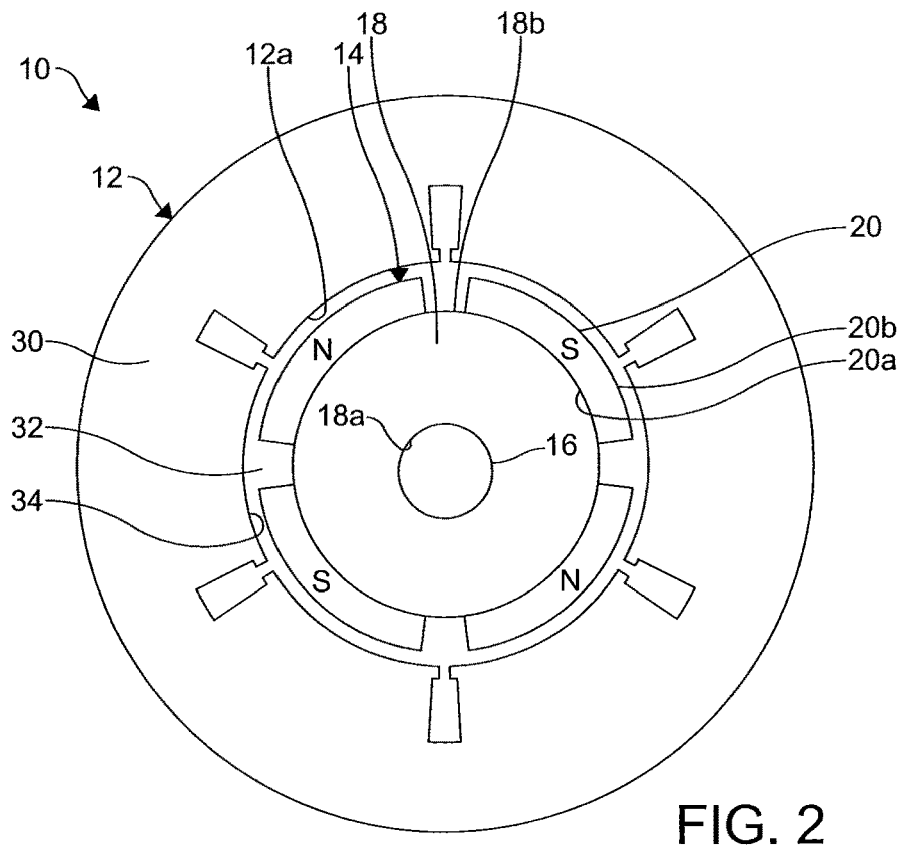
FIG. 2 is a schematic cross-sectional view taken along section line A-A of the BLDC motor shown in FIG. 1 according to an embodiment, wherein the casing is not shown.

As illustrated in FIG. 2, the outer surface 18b or the rotor core 18 may include a plurality of magnets 20 mounted thereon. It is understood that that the magnets 20 may be permanent magnets if desired. In certain embodiments, the magnets 20 may be bonded to the rotor core 18. In other embodiments, a rotor banding or retaining ring structure may be used to secure the magnets 20 to the rotor core 18. The magnets 20 form a generally ring-shaped structure about the rotor core 18 so that a peripheral inner surface 20a of each of the magnets 20 is adjacent the outer surface 18b of the rotor core 18. A peripheral outer surface 20b of each of the magnets 20 is adjacent a peripheral inner surface 12a of the first stator 12 and a peripheral inner surface 13a of the second stator 13 so that the rotor 14 may have induction with each of the first stator 12 and the second stator 13.

Figure 3:
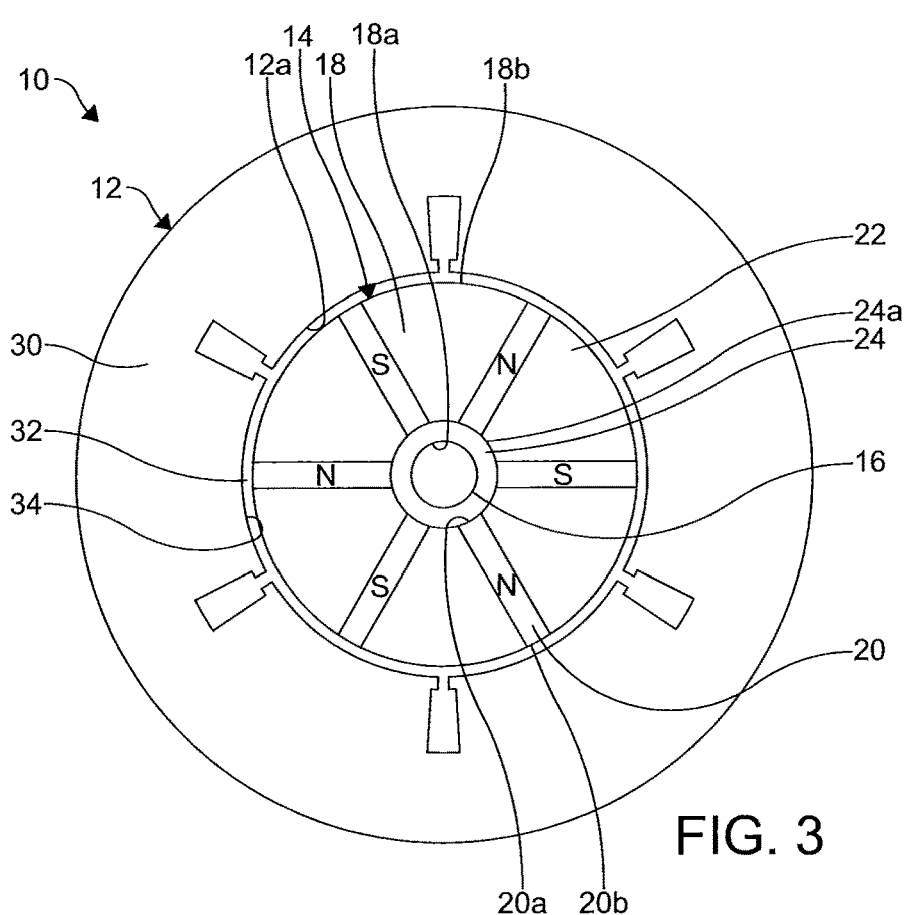
FIG. 3 is a schematic cross-sectional view taken along section line A-A of the BLDC motor shown in FIG. 1 according to another embodiment, wherein the casing is not shown.

In certain other embodiments shown in FIG. 3, the magnets 20 are disposed within the rotor core 18. Each of the magnets 20 shown in FIG. 3 is disposed between a pair of wedge-shaped portions 22 of the rotor core 18. The magnets 20 are equally circumferentially spaced apart and radially outwardly extending from a central core 24. The peripheral inner surface 20a of the magnets 20 is adjacent a peripheral outer surface 24a of the central core 24. In certain embodiments, the central core 24 is formed from a non-magnetic material. The central core 24 may be coupled to the shaft 16 by any method as desired. It is understood, however, that the central core 24 of the rotor core 18 and the shaft 16 may be a unitary structure if desired. The peripheral outer surface 20b of each of the magnets 20 is adjacent the peripheral inner surface 12a of the first stator 12 and the peripheral inner surface 13a of the second stator 13 so that the rotor 14 may have induction with each of the first stator 12 and the second stator 13.

Figure 4:
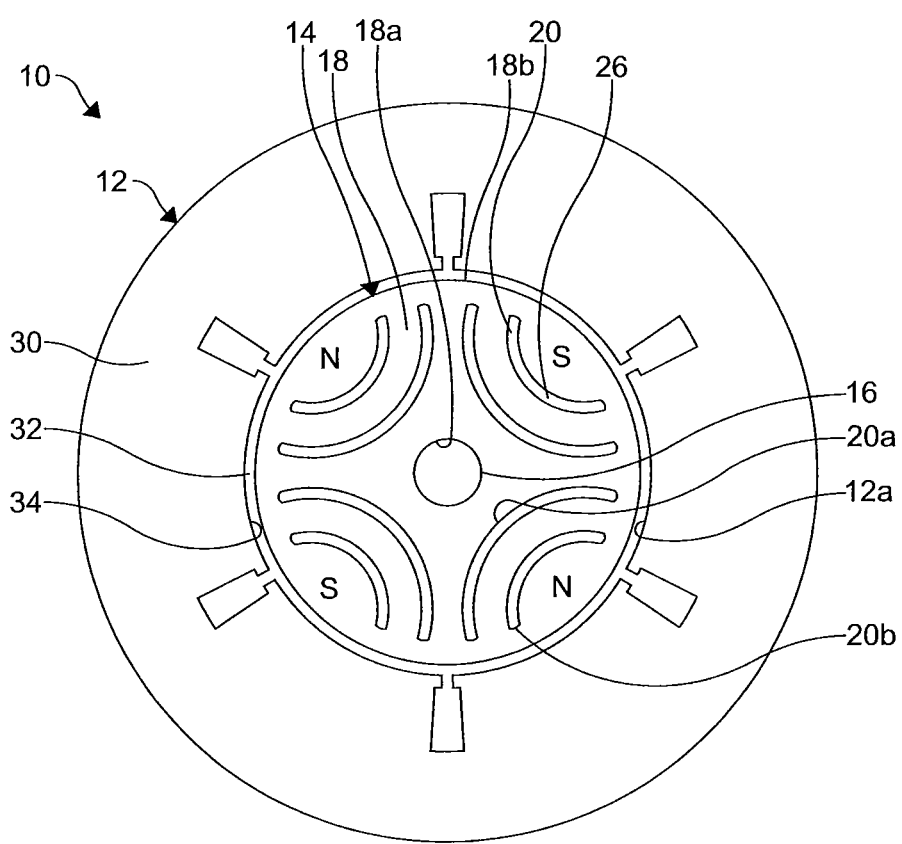
FIG. 4 is a schematic cross-sectional view taken along section line A-A of the BLDC motor shown in FIG. 1 according to another embodiment, wherein the casing is not shown.

As illustrated in FIG. 4, each of the magnets 20 may be disposed in a plurality of slots 26 formed in the rotor core 18. Each of the slots 26 shown has a substantially arcuate shape. It is understood, however, that the slots 26 and the magnet 20 can have any shape and size as desired. It is further understood that the rotor core 18 can have more or less slots 26 formed therein, if desired. Similar to the embodiments shown in FIGS. 2-3, the peripheral outer surface 20b of each of the magnets 20 is adjacent the peripheral inner surface 12a of the first stator 12 and the peripheral inner surface 13a of the second stator 13 so that the rotor 14 may have induction with each of the first stator 12 and the second stator 13. It is understood that many other types of rotors 14 and rotors 14 having various other magnet configurations can be used in the motor 10 if desired. In the embodiments shown in FIGS. 2-4, the magnets 20 form alternatingly disposed magnetic poles commonly known as a north pole "N" and a south pole "S". The number of magnetic poles can vary depending on an application of the motor 10.

In preferred embodiments, the first stator 12 is configured to achieve certain performance requirements and selectively cause a rotational movement of the rotor 10 for normal operation of the motor 10, and the second stator 13 is configured to selectively maintain a stationary position of the rotor 14 against a force exerted by an external source. In certain embodiments, the second stator 13 is configured to have a greater torque constant Kt than a torque constant Kt of the first stator 12 so that less electrical current is required to maintain the stationary position of the rotor 14 than is required during normal operation of the motor 10. Accordingly, an overheating of the motor 10 is militated against.

As illustrated in FIG. 1, the first stator 12 includes a cylindrical stator core 30 having a central aperture 32 formed axially therethrough. The rotor 14 is disposed within the central aperture 32 of the first stator 12. A plurality of pole arms 34 with radial windings 36, shown in FIGS. 5 and 6, wound therearound extend radially inward from the stator core 30 of the first stator 12 toward the rotor 14. In one preferred embodiment, the pole arms 34 are positioned circumferentially equidistant from each other around the stator core 30 of the first stator 12. In some embodiments, as depicted in FIGS. 2-6, the first stator 12 has six pole arms 34 positioned therein.

FIG. 1 further illustrates the second stator 13 includes a cylindrical stator core 42 having a central aperture 44 formed axially therethrough. The rotor 14 is also disposed within the central aperture 44 of the second stator 13. A plurality of pole arms (not shown) with radial windings 46, shown in FIGS. 5 and 6, wound therearound extend radially inward from the stator core 42 of the second stator 13 toward the rotor 14. In one preferred embodiment, the pole arms are positioned circumferentially equidistant from each other around the stator core 42 of the second stator 13. In certain embodiments, the greater torque constant Kt of the second stator 13 is achieved by increasing the number of windings 46 by reducing a wire gauge used for the windings 46. In other embodiments, the greater torque constant Kt of the second stator 13 is achieved by reducing an air gap between the windings 46. Thus, the air gap between the windings 36 of the first stator 12 is greater than the air gap between the windings 46 of the second stator 13. In yet other embodiments, the greater torque constant Kt of the second stator 13 is achieve by increasing a length of the second stator 13. It is understood that various other methods of achieving a greater torque constant Kt of the second stator 13 can be employed if desired.

According to the embodiment illustrated in FIG. 5, the first stator 12 and the second stator 13 each may be a three-phase stator having six radial windings 36, 46 extending radially inward from the stator cores 30, 42, respectively. A first pair of the windings 36 is dedicated to a phase "U" of the first stator 12, a second pair of the windings 36 is dedicated to a phase "V" of the first stator 12, and a third pair of the windings 36 is dedicated to a phase "W" of the first stator 12. Similarly, a first pair of the windings 46 is dedicated to a phase "U" of the second stator 13, a second pair of the windings 46 is dedicated to a phase "V" of the second stator 13, and a third pair of the windings 46 is dedicated to a phase "W" of the second stator 13. The windings 36, 46 are switchably driven according to a sequence which must be synchronized with the instantaneous position of the rotor 14 by a control system 40 in electrical communication with the stators 12, 13.

As illustrated, the control system 40 includes switches 48a, 48b, 48c, 48d, 48e, 48f to control a supply of electrical current to the windings 36 of the first stator 12 during a normal operation of the motor 10. In one preferred embodiment, the pair of switches 48a, 48b are closed to energize the phase U of the first stator 12, the pair of switches 48c, 48d are closed to energize the phase V of the first stator 12, and the pair of switches 48e, 48f are closed to energize the phase W of the first stator 12. As such, two pairs of the switches 48a, 48b, 48c, 48d, 48e, 48f are closed and the remaining one pair of the switches 48a, 48b, 48c, 48d, 48e, 48f remain open for a rotation of the rotor 14, relative to the first stator 12, to occur during normal operation of the motor 10.

The control system 40 further includes switches 50a, 50b, 50c, 50d, 50e, 50f to control a supply of electrical current to the windings 46 of the second stator 13 during certain applications of the motor 10 requiring the stationary position of the rotor 14 to be maintained against the force exerted on the rotor 14 by the external source (not shown). In one preferred embodiment, the pair of switches 50a, 50b are closed to energize the phase U of the second stator 13, the pair of switches 50c, 50d are closed to energize the phase V of the second stator 13, and the pair of switches 50e, 50f are closed to energize the phase W of the second stator 13. As such, two pairs of the switches 50a, 50b, 50c, 50d, 50e, 50f are closed and the remaining one pair of the switches 50a, 50b, 50c, 50d, 50e, 50f remain open for the second stator 13 to produce a resistance force against the force exerted on the rotor 14 by the external source (not shown), resulting in the stationary position of the rotor 14 to be maintained during certain applications of the motor 10.

In another preferred embodiment shown in FIG. 6, the first stator 12 may be a three-phase stator having six radial windings 36 extending radially inward from the stator core 30. It is understood that the structure and operation of the first stator 12 included in the embodiment shown in FIG. 6 may be substantially similar to the structure and operation of the first stator 12 described for the embodiment shown in FIG. 5. A first pair of the windings 36 is dedicated to a phase "U" of the first stator 12, a second pair of the windings 36 is dedicated to a phase "V" of the first stator 12, and a third pair of the windings 36 is dedicated to a phase "W" of the first stator 12. Contrarily, the second stator 13 shown in FIG. 6 may a single-phase stator having a pair of radial windings 46 extending radially inward from the stator core 42. The windings 36, 46 are switchably driven according to a sequence which must be synchronized with the instantaneous position of the rotor 14 by a control system 52 in electrical communication with the stators 12, 13.

As illustrated, the control system 52 includes switches 54a, 54b, 54c, 54d, 54e, 54f to control a supply of electrical current to the windings 36 of the first stator 12 during a normal operation of the motor 10. In one preferred embodiment, the pair of switches 54a, 54b are closed to energize the phase U of the first stator 12, the pair of switches 54c, 54d are closed to energize the phase V of the first stator 12, and the pair of switches 54e, 54f are closed to energize the phase W of the first stator 12. As such, two pairs of the switches 54a, 54b, 54c, 54d, 54e, 54f are closed and the remaining one pair of the switches 54a, 54b, 54c, 54d, 54e, 54f remain open for a rotation of the rotor 14, relative to the first stator 12, to occur during normal operation of the motor 10.

The control system 52 further includes a switch 56 to control a supply of electrical current through lines L1, L2 to the windings 46 of the second stator 13. Energization of the windings 46 is desired during certain applications of the motor 10 requiring the stationary position of the rotor 14 to be maintained against the force exerted on the rotor 14 by the external source (not shown). In one preferred embodiment, the switch 56 is closed to energize the single phase of the second stator 13. As such, the switch 56 is closed for the second stator 13 to produce a resistance force against the force exerted on the rotor 14 by the external source (not shown), resulting in the stationary position of the rotor 14 to be maintained during certain applications of the motor 10.

Each of the first stator 12 and the second stator 13 may also include a plurality of sensors (not shown) positioned circumferentially equidistant from each other. It is understood that more or less sensors may be used depending on the application of the motor 10. In certain embodiments, the sensors can be, but are not limited to, magnetic sensors, for example, Hall effect sensors or coils. Various other types of sensors may be employed depending on the application of the motor 10. The sensors may be in electrical communication with the control system 40, shown in FIG. 5, and the control system 52, shown in FIG. 6. The sensors are configured to provide discrete signals indicative of the states of the motor 10 to the control system 40, shown in FIG. 5, and the control system 52, shown in FIG. 6, to indicate a position of the rotor 14 within the first stator 12 and a position of the rotor 14 within the second stator 13.

Each of the control systems 40, 52 is also in communication with a voltage source which produces a supply of a voltage V. The control systems 40, 52 each control the electrical current supplied to the stators 12, 13 of the motor 10 in a way that controls the position of the rotor 14 relative to the stators 12, 13. The electrical currents in the windings 36 of the first stator 12 generate a magnetic field, which produces torque by interaction with the permanent magnets 20 pushing the rotor 14 to rotate about the shaft 16 to a new position. A rotational speed of the motor 10 can be adjusted by the control systems 40, 52 by varying the supply of voltage V to the first stator 12. In certain applications of the motor 10, the electrical currents in the windings 46 of the second stator 13 generate a magnetic field, which produces torque by interaction with the permanent magnets 20 producing a resistive force against the force exerted on the rotor 14 by the external source, and thereby maintaining a stationary position of the rotor 14. The resistive force against the force exerted on the rotor 14 can be adjusted by the control systems 40, 52 by varying the supply of the voltage V to the second stator 13.

During normal operation of the motor 10, two of the three phases U, V, W of the first stator 12 are energized by the supply of electrical current to two pairs of the windings 36 while a remaining one of the phase U, V, W, of the first stator 12 remains de-energized by militating against the supply of electrical current to the remaining pair of the windings 36 of the first stator 12. The supply of electrical current to the second stator 13 is also militated against. As such, the windings 46 of the second stator 13 also remain de-energized. Such energization of two of the three phases U, V, W, of the first stator 12 permits a rotation of the rotor 14, relative to the first stator 12, to occur during normal operation of the motor 10. Additionally, the motor 10 has six states of magnetic flux within an operational sequence. Progression through the six states of magnetic flux within the operational sequence results in a 360° rotation of the rotor 14. As such, a continued rotation of the rotor 14, relative to the first stator 12, is achieved by repeating the operational sequence many times over.

In certain applications, however, there is a need to cease the rotation of the rotor and maintain a stationary position thereof by producing a resisting force against a force exerted by an external source. During such operation of the embodiment shown in FIG. 5, the supply of electrical current to the first stator 12 is militated against and two of the three phases U, V, W of the second stator 13 are energized by the supply of electrical current to two pairs of the windings 46 while a remaining one of the phase U, V, W, remains de-energized, by militating against the supply of electrical current to the remaining pair of the windings 46. Such de-energization of the first stator 12 and energization of two of the three phases U, V, W, of the second stator 13 produces a resistance force against the force exerted on the rotor 14 by the external source (not shown), resulting in the stationary position of the rotor 14 being maintained during certain applications of the motor 10.

In other certain embodiments shown in FIG. 6, the supply of electrical current to the first stator 12 is militated against and the single phase of the second stator 13 is energized by the supply of electrical current through lines L1, L2 to the windings 46 of the second stator 13. Such de-energization of the first stator 12 and energization of the windings 46 of the second stator 13 produces a resistance force against the force exerted on the rotor 14 by the external source (not shown), resulting in the stationary position of the rotor 14 being maintained during certain applications of the motor 10.

In accordance with the provisions of the patent statutes, the present subject matter has been described in what is considered to represent its preferred embodiments. However, it should be noted that the subject matter can be practiced otherwise than as specifically illustrated and described without departing from its spirit or scope.

What is claimed:

1. A brushless direct current motor, comprising:
   a rotor;
   a first stator disposed adjacent the rotor;
   a second stator disposed adjacent the rotor; and
   a control system in electrical communication with the first stator and the second stator, wherein the control system includes a first plurality of switches to selectively control direct current supplied to the first stator and a second plurality of switches to selectively control direct current supplied to the second stator, wherein the first stator and the first plurality of switches are configured to selectively cause a rotational movement of the rotor during a normal operation of the motor, and wherein the second stator and the second plurality of switches are configured to selectively maintain a stationary position of the rotor against a force exerted by an external source.

2. The brushless direct current motor according to claim 1, wherein at least one of the first stator and the second stator is disposed radially about the rotor.

3. The brushless direct current motor according to claim 1, wherein the second stator is disposed axially adjacent the first stator.

4. The brushless direct current motor according to claim 1, wherein the first stator is a three-phase stator.

5. The brushless direct current motor according to claim 1, wherein the second stator is one of a three-phase stator and a single-phase stator.

6. The brushless direct current motor according to claim 1, wherein a torque constant Kt of the second stator is greater than a torque constant Kt of the first stator.

7. The brushless direct current motor according to claim 1, wherein the first stator includes a plurality of windings formed thereon.

8. The brushless direct current motor according to claim 7, wherein the second stator includes a plurality of windings formed thereon.

9. The brushless direct current motor according to claim 8, wherein a number of the windings of the second stator is greater than a number of the windings of the first stator.

10. The brushless direct current motor according to claim 8, wherein an air gap between the windings of the first stator is greater than an air gap between the windings of the second stator.

11. The brushless direct current motor according to claim 1, wherein a length of the second stator is greater than a length of the first stator.

12. A method for controlling a brushless direct current motor, the method comprising the steps of:
    providing a brushless direct current motor according to claim 1;
    selectively supplying an electrical current to the first stator to cause a rotational movement of the rotor; and
    selectively supplying an electrical current to the second stator to maintain a stationary position of the rotor by producing a resistive force against a force exerted by an external source.

13. The method for controlling the brushless direct current motor according to claim 12, wherein a torque constant Kt of the second stator is greater than a torque constant Kt of the first stator.

14. The method for controlling the brushless direct current motor according to claim 12, further including the step of providing a control system in electrical communication with the first stator and the second stator, wherein the control system includes at least one switch to selectively control a supply of electrical current to the first stator and at least one switch to selectively control a supply of electrical current to the second stator.

15. The method for controlling the brushless direct current motor according to claim 12, wherein at least one of the first stator and the second stator is disposed radially about the rotor.

16. The method for controlling the brushless direct current motor according to claim 12, wherein the first stator is a three-phase stator.

17. The method for controlling the brushless direct current motor according to claim 12, wherein the second stator is one of a three-phase stator and a single-phase stator.

18. The method for controlling the brushless direct current motor according to claim 12, wherein the first stator includes a plurality of windings formed thereon and the second stator includes a plurality of windings formed thereon.

19. The method for controlling the brushless direct current motor according to claim 18, wherein a number of the windings of the second stator is greater than a number of the windings of the first stator.

* * * * *